No. 743,522. PATENTED NOV. 10, 1903.
H. KEPPLER.
COATING GLASS OR FABRICS.
APPLICATION FILED FEB. 21, 1903.
NO MODEL.
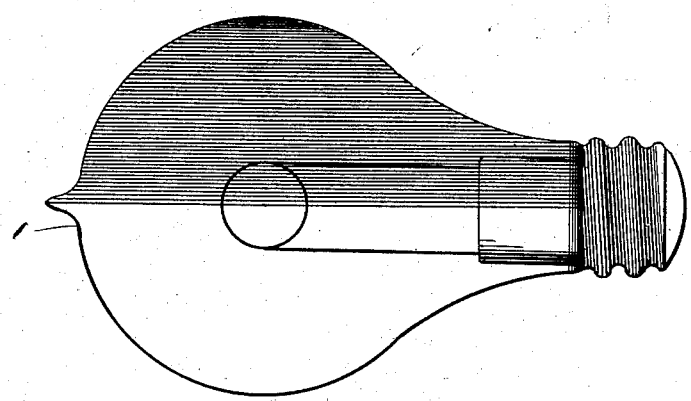
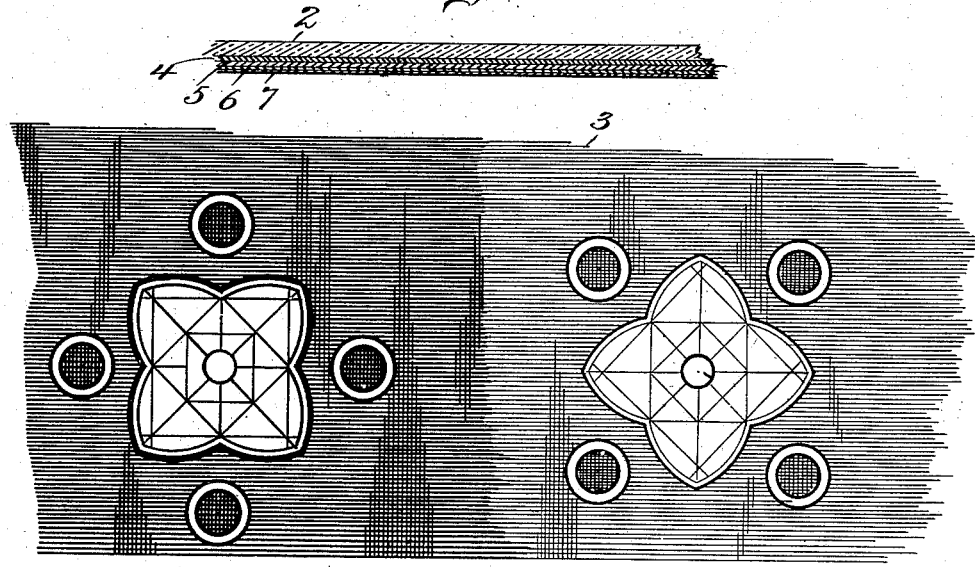
Witnesses
W. T. S. Duvall
C. F. Duvall
Inventor
Henry Keppler,
by W. T. Duvall
Attorney No. 743,522. Patented November 10, 1903.

UNITED STATES PATENT OFFICE.

HENRY KEPPLER, OF BROOKLYN, NEW YORK.

COATING GLASS OR FABRICS.

SPECIFICATION forming part of Letters Patent No. 743,522, dated November 10, 1903.

Application filed February 21, 1903. Serial No. 144,496. (No specimens.)

*To all whom it may concern:*

Be it known that I, HENRY KEPPLER, a citizen of the United States, residing at Brooklyn, in the county of Kings and State of New York, have invented new and useful Improvements in Coating Glass, Fabrics, &c., of which the following is a specification.

This invention has for its object to produce a novel and useful method for depositing metal on glass, fabrics, and other materials; and the invention consists in the use of materials in the order named, all as hereinafter mentioned in detail.

Referring to the drawings, Figure 1 represents an electric-light globe treated with my process, whereby the upper side is rendered opaque. Fig. 2 represents a piece of glass treated with my process. Fig. 3 represents a piece of lace a portion of which has been treated in accordance with my process.

Similar numerals of reference indicate similar parts in all the figures of the drawings.

In Figs. 1 and 2 of the drawings I have illustrated my process as applied to glass, and the latter may be in the form of an electric-light or other globe 1 or simply a sheet of glass 2.

In carrying out my process I first mix medium bronze lacquer with illuminous powder and apply the same evenly over the surface of the glass. This gives the surface a frosted appearance, and by reason of the illuminating properties of the composition thus formed when applied to one-half of a light-globe, as 1, acts as a reflector. The lacquer of course serves to form an adhesive base for the powder. Also, as will readily appear, where the reflective characteristics are undesirable simply the lacquer is applied and the illuminous powder omitted. This would especially be true in coating fabrics—such, for instance, as lace, (illustrated in Fig. 3 as 3.)

The second step in my process is to mercerize white rubbing-varnish and apply the same evenly over the first mixture after the latter has thoroughly dried. The third step is to dust this surface before drying with gold-bronze powder. The surface is then dried. The final step is to subject the article thus coated to a copper-bath, after which it may be painted or enameled.

In the drawings, Fig. 2, 4 designates the coating of medium bronze lacquer and illuminous powder. 5 designates the coating of mercerized white rubbing-varnish. 6 designates the coating of bronze powder. 7 designates the coating of copper deposit, and 8 designates the paint or enamel.

When this process is applied to an electric-light or other globe, it will be apparent that the portion thus treated will be entirely opaque and that the inner surface of said coating will serve as a brilliant reflector.

As before stated, my invention will also be found highly useful in coating fabrics with metal, especially lace. Heretofore, so far as my knowledge goes, whenever this has been attempted the result has been that the lace thus coated is rendered stiff and practically unfit for use for certain purposes. By my process, however, the lace or fabric retains to a surprising degree its pliability, and hence is capable of many uses and applications heretofore impossible.

Having described my invention, what I claim is—

1. The herein-described process for coating glass, &c., which consists in the following steps, to wit, first coating the article with a bronze lacquer; second, coating the above surface when dry with white rubbing-varnish; third, dusting before drying with a bronze powder, and fourth, subjecting to a copper-bath.

2. The herein-described process for coating glass, &c., which consists in the following steps, to wit, first coating the article with a bronze lacquer; second, coating the above surface when dry with white rubbing-varnish; third, dusting before drying with a bronze powder; fourth, subjecting to a copper-bath, and finally painting.

3. The herein-described process for coating glass, which consists in the following steps, to wit, first coating the article with a mixture of medium bronze lacquer and illuminous powder; second, drying; third, covering the first coat with one of white rubbing-varnish; fourth immediately dusting the same with bronze powder; fifth, subjecting to a copper-bath; and sixth painting.

In testimony whereof I affix my signature in presence of two witnesses.

HENRY KEPPLER.

Witnesses:
FRANK KELLY,
JOHN H. KEPPLER.